(12) United States Patent
Park et al.

(10) Patent No.: US 7,796,871 B2
(45) Date of Patent: Sep. 14, 2010

(54) APPARATUS AND METHOD FOR TAKING PANORAMIC PHOTOGRAPH

(75) Inventors: Kyong Ha Park, Suwon-si (KR); Hyun Su Hong, Seongnam-si (KR); Jae Myeon Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 805 days.

(21) Appl. No.: 11/704,704

(22) Filed: Feb. 9, 2007

(65) Prior Publication Data

US 2007/0263995 A1 Nov. 15, 2007

(30) Foreign Application Priority Data

Mar. 29, 2006 (KR) .................. 10-2006-0028604

(51) Int. Cl.
*G03B 41/00* (2006.01)
(52) U.S. Cl. .................................. 396/50; 396/322
(58) Field of Classification Search .............. 396/50, 396/322; 348/36, 39
See application file for complete search history.

(56) References Cited

U.S. PATENT DOCUMENTS

| 5,940,641 | A | 8/1999 | McIntyre et al. | |
|---|---|---|---|---|
| 6,304,284 | B1 * | 10/2001 | Dunton et al. | 348/36 |
| 6,510,283 | B1 * | 1/2003 | Yamagishi | 396/55 |
| 2004/0263635 | A1 | 12/2004 | Katagiri et al. | |
| 2005/0094004 | A1 | 5/2005 | Gotanda | |
| 2005/0099494 | A1 | 5/2005 | Deng et al. | |
| 2005/0237383 | A1 | 10/2005 | Soga | |

FOREIGN PATENT DOCUMENTS

| EP | 1 628 474 | 8/2005 |
|---|---|---|
| JP | 2001169223 | 6/2001 |
| JP | 2002101318 | 4/2002 |
| JP | 2004-229002 | 8/2004 |
| JP | 2004-304735 | 10/2004 |
| JP | 2005-159540 | 6/2005 |
| KR | 1020040037605 | 5/2004 |
| KR | 1020050047788 | 5/2005 |
| KR | 1020060014813 | 2/2006 |
| KR | 1020060056050 | 5/2006 |

* cited by examiner

*Primary Examiner*—W. B. Perkey
(74) *Attorney, Agent, or Firm*—The Farrell Law Firm, LLP

(57) ABSTRACT

An apparatus and a method for taking a panoramic photograph are provided. While a lens of the apparatus is rotated, an angular velocity sensor such as a gyroscope outputs an angular velocity and calculates therefrom a rotation angle of the lens. Accordingly, a user can capture sequential image segments for the panoramic photograph at suitable rotation angles. Since unintended rotations due to a user's hand trembling as well as user's intended rotations can be detected, it may be easy to align overlapped portions of adjacent images and thereby to obtain suitable images for panoramic photograph combination. Also, a user can be informed of a capturable section and a rotating direction by using the calculated angular velocity, so the apparatus may promote a user's convenience and without the need for a burdensome tripod.

17 Claims, 7 Drawing Sheets

APPARATUS AND METHOD FOR TAKING PANORAMIC PHOTOGRAPH

PRIORITY

This U.S. application claims priority under 35 U.S.C. §119 from Korean Patent Application No. 2006-28604, which was filed in the Korean Intellectual Property Office on Mar. 29, 2006, the contents of which are incorporated herein by reference herein.

BACKGROUND OF THE INVENTION

1. Field of the Invention

This invention relates generally to panoramic photograph technology using a mobile camera phone or a portable digital camera and, more particularly, to an apparatus and a method for taking a panoramic photograph at a suitable lens rotation angle derived from an angular velocity acquired by a sensor such as a gyroscope.

2. Description of the Related Art

Panoramic photography is a style of photography that aims to create images with exceptionally wide fields of view. Modern digital camera technology allows for the continuous capturing of multiple images around 360 degrees to create a single wide image.

The principle of panoramic photography is to stitch together widthwise or lengthwise multiple photographs, each of which forms a segment of the panorama. Each photograph is obtained by rotation of a camera at regular angles, partially overlapping the adjacent photograph. Then these photographs automatically combine into a single panoramic photograph through a proper program in a personal computer. A significant point of the panoramic photography is to align overlapping images so as to exactly combine them.

FIG. 1 illustrates a general concept of panoramic photography. As shown in FIG. 1, to create a desired panoramic photograph 10, a camera 11 captures a certain image segment 12 of the panoramic photograph 10 and then rotates to capture a next image segment 13. Here, two adjacent image segments 12 and 13 should partially overlap each other at a peripheral portion 14. If such a process is performed manually, the rotation of the camera 11 may be uneven and swinging. Furthermore, this may not only fail to align the overlapped portions 14 of the adjacent image segments 12 and 13, but also cause a blurred image due to hand trembling of a user.

A tripod for supporting the camera 11 may be effective in solving the above-discussed problem. The tripod may, however, be inconvenient and burdensome for a user to carry. Especially, a mobile terminal such as mobile camera phone requires another solution since such a terminal cannot use the tripod.

SUMMARY OF THE INVENTION

The present invention provides an apparatus and a method for taking a panoramic photograph to solve a conventional problem of the difficulty aligning overlapped portions of adjacent image segments when the panoramic photograph is taken using a mobile camera phone or a portable digital camera.

The present invention also provides an apparatus and a method for enabling a mobile terminal user to simply take the panoramic photograph without the need to carry a burdensome tripod.

The present invention further provides an apparatus and a method for taking a panoramic photograph to solve a user's hand trembling problem when the panoramic photograph is taken.

The present invention still further provides an apparatus and a method for taking a panoramic photograph to inform a user of a capturable section and a lens rotating direction.

According to an exemplary embodiment of the present invention, provided is an apparatus for taking a panoramic photograph. The apparatus includes a camera module that has a lens and captures an image for the panoramic photograph, a memory unit that stores the image captured by the camera module, and a display unit that visually exhibits the image stored in the memory unit and offers a preview image when a capture mode is enabled. The apparatus further includes an angular velocity sensor that outputs an angular velocity by perceiving a rotation of the lens, a rotation angle calculator that receives the angular velocity from the angular velocity sensor and calculates a corresponding rotation angle, and a control unit that receives the rotation angle from the rotation angle calculator and decides a capturable section of the panoramic photograph.

In the apparatus, the display unit shows the capturable section of the panoramic photograph and a rotation direction of the lens. The angular velocity sensor preferably is a gyroscope or a geomagnetic sensor, and outputs a horizontal angular velocity and a vertical angular velocity. The rotation angle calculator preferably has a low pass filter. The control unit preferably performs a hand-trembling correction algorithm.

According to another exemplary embodiment of the present invention, provided is a method for taking a panoramic photograph. This method includes capturing a first image of the panoramic photograph by operating a camera module having a lens and then storing the captured first image; calculating a first rotation angle of the lens from an angular velocity according to a rotation of the lens; deciding whether the first rotation angle is within a capturable section having lowest and highest values; notifying a stop of the rotation of the lens when the first rotation angle is within the capturable section; calculating a second rotation angle of the lens from an angular velocity according to a further rotation of the lens; deciding whether the absolute value of the second rotation angle is within a specific threshold value; and capturing a second image of the panoramic photograph by operating the camera module when the absolute value of the second rotation angle is within the specific threshold value and then storing the captured second image.

In this method, when the first rotation angle is not within the capturable section, the calculating step may be repeated after step (c). When the absolute value of the second rotation angle is not within the specific threshold value, the notifying step may be repeated.

The first rotation angle may be in a first direction, one of horizontal and vertical directions. In this case, the method may further include, before the calculating step, steps of (a-1) further computing the first rotation angle in a second direction, the other of the horizontal and vertical directions; and deciding whether the absolute value of the first rotation angle in the second direction is greater than a given value.

In this method, when the absolute value of the first rotation angle in the second direction is not greater than the given value, step the calculating may be performed after the deciding step (a-2). Also this method may further include a step of (a-3) when the absolute value of the first rotation angle in the second direction is greater than the given value, notifying a reverse rotation and then returning to the computing step. The second rotation angle may have a horizontal rotation angle and a vertical rotation angle.

The method may further include, after step, deciding whether a stationary state remains until a specific time lapses, wherein when the stationary state remains for the specific time, capturing the second image may be performed, and wherein when the stationary state does not remain for the specific time, the notifying step may be repeated.

In the method, the notifying step preferably includes visually displaying with a text or an image on a display unit, operating a lamp, or generating a sound.

In the method, the first decoding step (c) may include deciding whether the first rotation angle is smaller than the lowest value of the capturable section; notifying a forward rotation when the first rotation angle is smaller than the lowest value of the capturable section; deciding whether the first rotation angle is greater than the highest value of the capturable section when the first rotation angle is greater than the lowest value of the capturable section; and a second notifying a reverse rotation when the first rotation angle is greater than the highest value of the capturable section, wherein the first notifying step is performed when the first rotation angle is smaller than the highest value of the capturable section.

According to still another exemplary embodiment of the present invention, provided is a method for taking a panoramic photograph. This method includes capturing a first image of the panoramic photograph by operating a camera module having a lens and then storing the captured first image; rotating the lens; calculating a rotation angle of the lens from an angular velocity according to a rotation of the lens; deciding whether the rotation angle is within a capturable section having lowest and highest values; stopping the rotation of the lens when the rotation angle is within the capturable section; and capturing a second image of the panoramic photograph by operating the camera module and then storing the captured second image.

BRIEF DESCRIPTION OF THE DRAWINGS

The above and other objects, features and advantages of the present invention will become more apparent from the following detailed description in conjunction with the accompanying drawings, in which.

DETAILED DESCRIPTION OF THE PREFERRED EMBODIMENTS

Preferred embodiments of the present invention will now be described more fully hereinafter with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Figure 1:
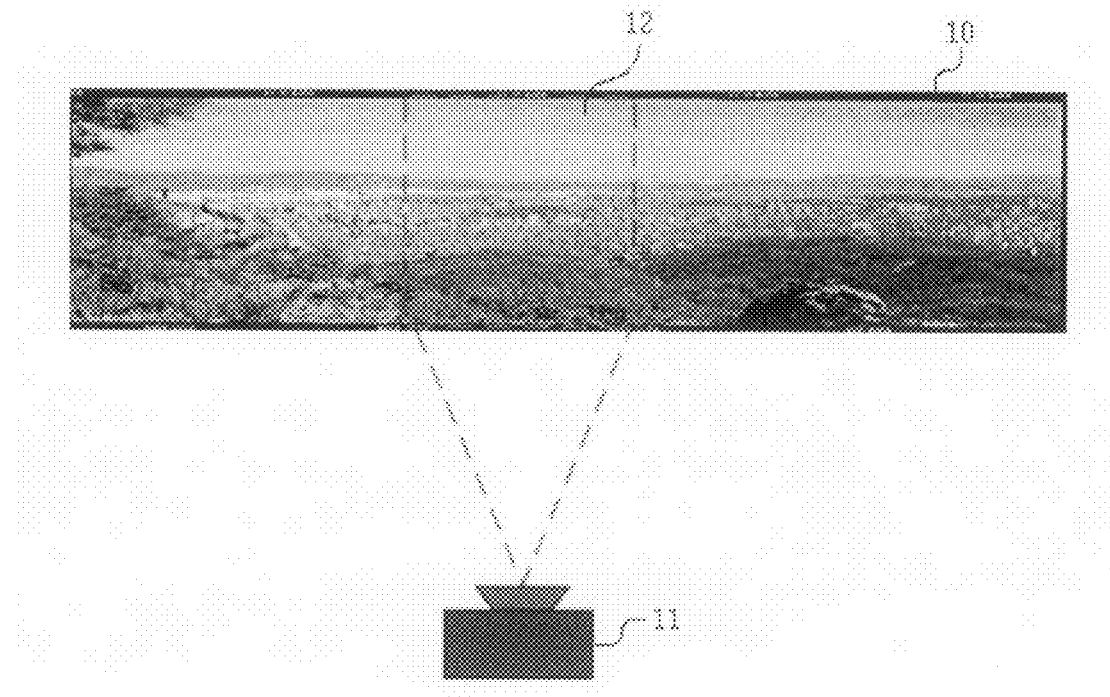
FIG. 1 illustrates a general concept of panoramic photography.
Figure 1:
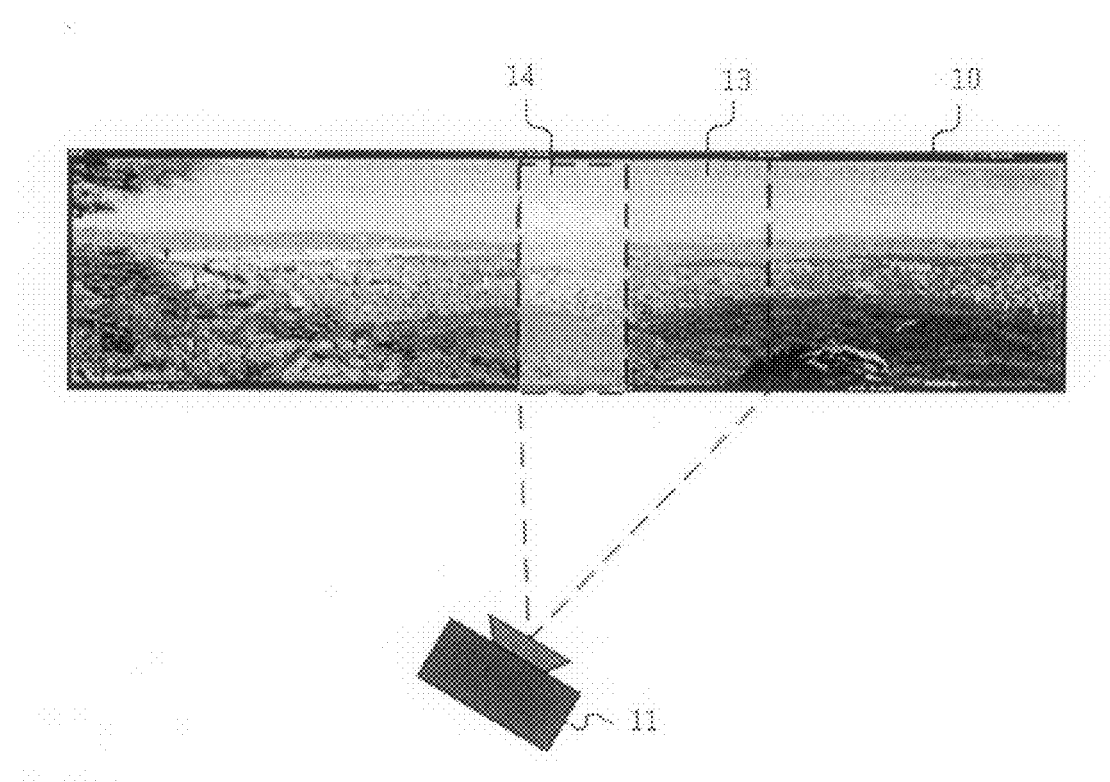
Figure 2:
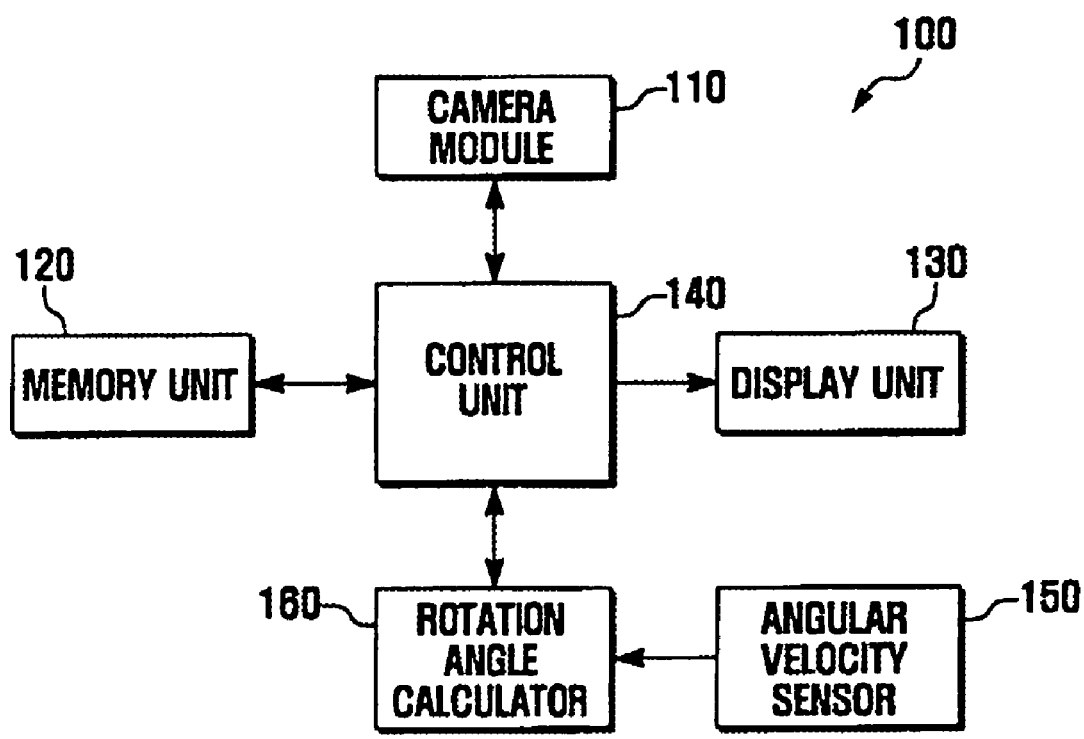
FIG. 2 is a block diagram illustrating an apparatus for taking a panoramic photograph in accordance with of the invention.

It is noted that well-known structures and processes are not described or illustrated in detail to avoid obscuring the essence of the present invention. FIG. 2 shows, in a block diagram, an apparatus for taking a panoramic photograph in accordance with the present invention. Referring to FIG. 2, the apparatus 100 includes a camera module 110, a memory unit 120, a display unit 130, a control unit 140, an angular velocity sensor 150, and a rotation angle calculator 160.

The camera module 110 includes a lens and an image sensor such as a Charge Coupled Device (CCD) or a Complementary Metal Oxide Semiconductor (CMOS) sensor. The camera module 110 executes image-capturing functions and is equipped in a mobile terminal such as a mobile camera phone or a portable digital camera.

The memory unit 120 stores various programs for the image-capturing functions and related functions. The memory unit 120 also stores images captured by the camera module 110.

The display unit 130 visually exhibits various function menus executed in the apparatus 100 and image data stored in the memory unit 120. Especially, the display unit 130 offers a preview image when a capture mode is enabled, and also shows information about a capturable section of the panoramic photograph and a rotation direction of the lens. Detailed descriptions regarding provided below.

The control unit 140 controls the overall operation of the apparatus 100. Especially, the control unit 140 decides the capturable section of the panoramic photograph by using the rotation direction of the lens, and then informs it to a user. A detailed description regarding this function is provided below. Furthermore, the control unit 140 performs a hand-trembling correction algorithm as well known in the art.

The angular velocity sensor 150 outputs the angular velocity depending on the rotation of the lens. For example, a gyroscope may be used as the angular velocity sensor 150. In general, the gyroscope may be used to detect an instantaneous and detailed movement, thereby allowing calculation of the magnitude of rotation. Although the gyroscope with a single axis may be available for taking the panoramic photograph, a double-axes gyroscope is preferable to obtain horizontal and vertical angular velocities for more reliable and exact use. Instead of the gyroscope, a geomagnetism sensor with two or more axes may be used.

The rotation angle calculator 160 receives an angular velocity signal from the angular velocity sensor 150 and calculates a corresponding rotation angle. The rotation angle calculator 160 preferably includes a Low Pass Filter (LPF).

Figure 3A:
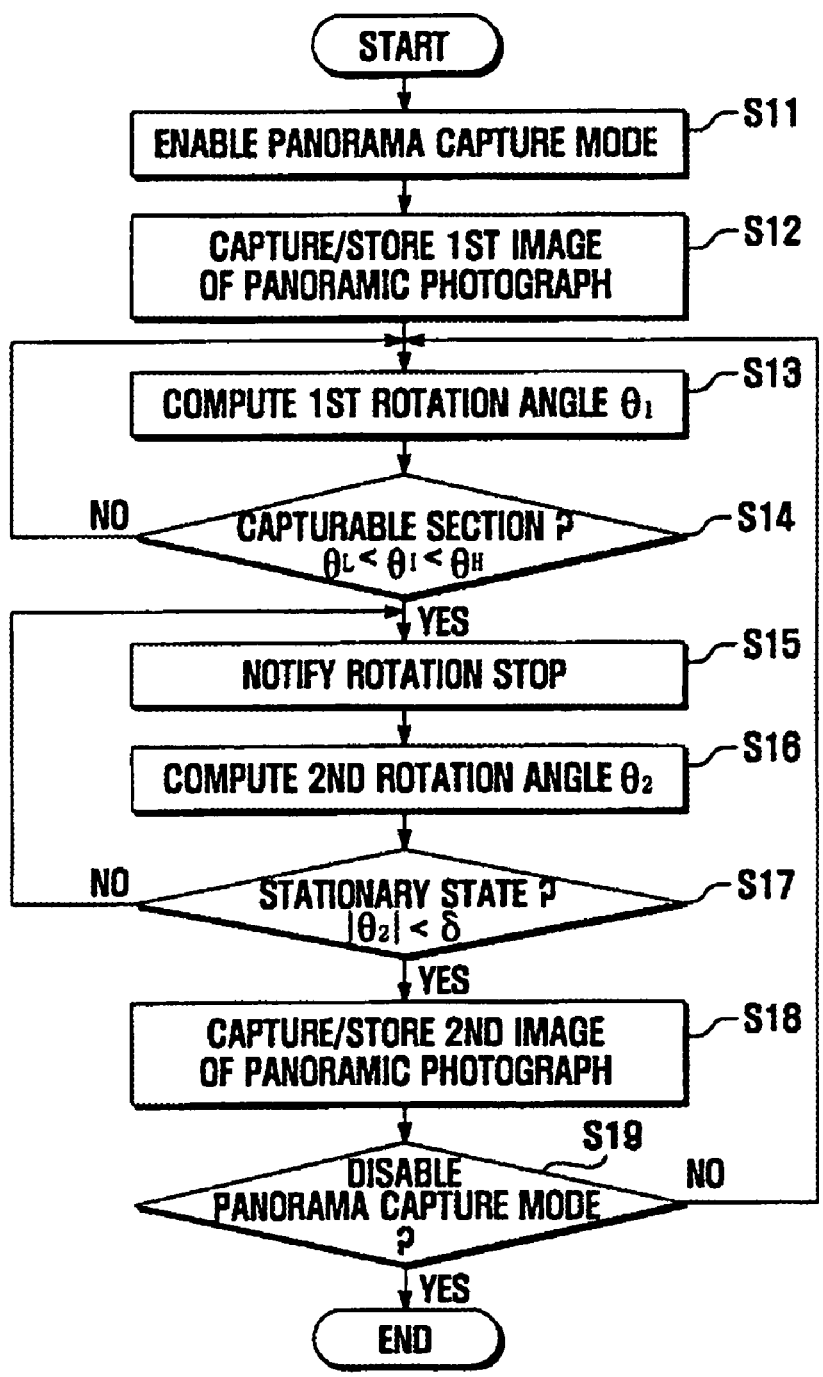
FIG. 3A is a flow diagram illustrating a method for taking a panoramic photograph in accordance with of the invention.

FIG. 3A illustrates, in a flow diagram, a method for taking a panoramic photograph in accordance with the present invention. The following description of the method provides detail about the configuration of the above-discussed apparatus.

Referring to FIGS. 2 and 3A, as a panorama capture mode is enabled in step S11, the control unit 140 operates the camera module 110 to capture a first image of the panoramic photograph and then stores the captured image in the memory unit 120 S12. To capture the first image of the panoramic photograph, a user decides a shooting position and presses a shutter while viewing the preview image on the display unit 120.

Next, the angular velocity sensor 150 senses the rotation of the lens and outputs the resultant angular velocity. Then the rotation angle calculator 160 computes a first rotation angle $\theta_1$ from the outputted angular velocity S13. After capturing the first image of the panoramic photograph, a user intentionally rotates the camera module 110 so as to capture an adjacent second image. An optical axis of the lens is therefore rotated at a specific angle, which corresponds to the first rotation angle $\theta_1$.

The first rotation angle $\theta_1$ is transmitted to the control unit 140, which decides whether the first rotation angle $\theta_1$ falls within the capturable section S14. As discussed above, each image segment for the panoramic photograph should be partially overlapped with a next adjacent image segment at a peripheral portion. For this, in consideration of a viewing angle of the lens, a specific range $\theta_L < \theta_1 < \theta_H$ of the first rotation angle $\theta_1$ is defined as the capturable section. For example, if the viewing angle of the lens is 40°, the capturable section may be established by the first rotation angle between 20° and 30°. In this case, the first rotation angle of 20° means that a half-overlapped image can be captured. Similarly, the first rotation angle of 30° means that a quarter-overlapped image can be captured. The lowest and highest values $\theta_L$ and $\theta_H$ of the capturable section may be already assigned as a default or arbitrarily established by a user.

If the first rotation angle $\theta_1$ is within the capturable section, the control unit 140 notifies a user to stop the rotation S15. Notification of the rotation stop preferably includes a visual reminder such as a text or an image displayed on the display unit 130, and further includes a lamp or a sound notification. If the first rotation angle is out of the capturable section, the previous steps S13 and S14 are repeated.

After the notification of the rotation stop, the angular velocity sensor 150 senses the rotation of the lens and outputs the resultant angular velocity. Additionally, the rotation angle calculator 160 computes a second rotation angle $\theta_2$ from the outputted angular velocity S16. Contrary to the first rotation angle, the second rotation angle is produced despite user's intention. That is, seeing the notification of the rotation stop, a user stops the rotation of the lens. However, a user's hand trembling often causes an unintended rotation. Therefore, the optical axis of the lens may be rotated at a specific angle, which corresponds to the second rotation angle $\theta_2$.

The second rotation angle $\theta_2$ is transmitted to the control unit 140, which decides whether the lens is in a stationary state. That is, the control unit 140 decides whether the absolute value $|\theta_2|$ of the second rotation angle comes within a specific threshold value $\delta$ S17. Even though the lens may not be completely stationary, the second rotation angle $\theta_2$ lower than the threshold value $\delta$ may be available for taking the panoramic photographs by applying the hand-trembling correction algorithm.

If the lens is not in the stationary state, the previous steps are repeated from S15. If the lens is in the stationary state, the control unit 140 operates the camera module 110 to capture a second image of the panoramic photograph, while applying the hand-trembling correction algorithm. Then the control unit 140 stores the captured image in the memory unit 120 S18. A user decides a shooting position to capture the second image and presses a shutter while viewing the preview image that the display unit 120 offers.

Next, the control unit 140 decides whether the panorama capture mode is disabled S19. If the panorama capture mode is still enabled, the control unit 140 repeats the previous steps from S13 to capture subsequent images of the panoramic photograph.

Figure 3B:
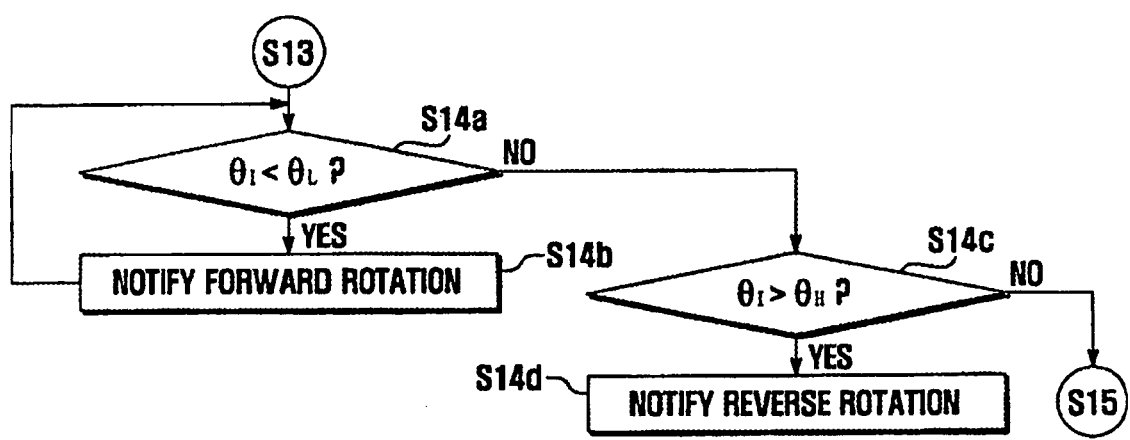
FIG. 3B is a flow diagram illustrating in detail a specific step of FIG. 3A.

In the method for taking the panoramic photograph discussed heretofore, the step S14 of deciding whether the capturable section preferably includes sub-steps shown in FIG. 3B.

Referring to FIG. 3B, the control unit 140 decides whether the first rotation angle $\theta_1$ is lower than the lowest value $\theta_L$ of the capturable section in step S14a. If the first rotation angle is lower the lowest value of the capturable section ($\theta_1 < \theta_L$), the control unit 140 provides a forward rotation notification in step S14b. If not, the control unit 140 decides whether the first rotation angle $\theta_1$ is higher than the highest value $\theta_H$ of the capturable section in step S14c. If the first rotation angle is higher than the highest value of the capturable section ($\theta_1 > \theta_H$), the control unit 140 provides a reverse rotation notification in step S14d. If not, the control unit 140 decides that the first rotation angle is within the capturable section ($\theta_L < \theta_1 < \theta_H$).

That is to say, when a user rotates the lens of the camera module in a certain direction after taking the first image segment for the panoramic photograph, the control unit provides notification of a direction to rotate toward the capturable section. For example, at the beginning of the rotation in a left direction, the notification indicates the leftward rotation. However, if the rotation passes by the capturable section, the notification changes from the leftward rotation into the rightward rotation. Such notification is preferably given by an arrow-like directional symbol on the display unit, though a lamp, a sound, and the like may also be used. For a user's convenience, a remaining angle to the capturable section is preferably indicated utilizing numerals showing the angle.

Figure 4:
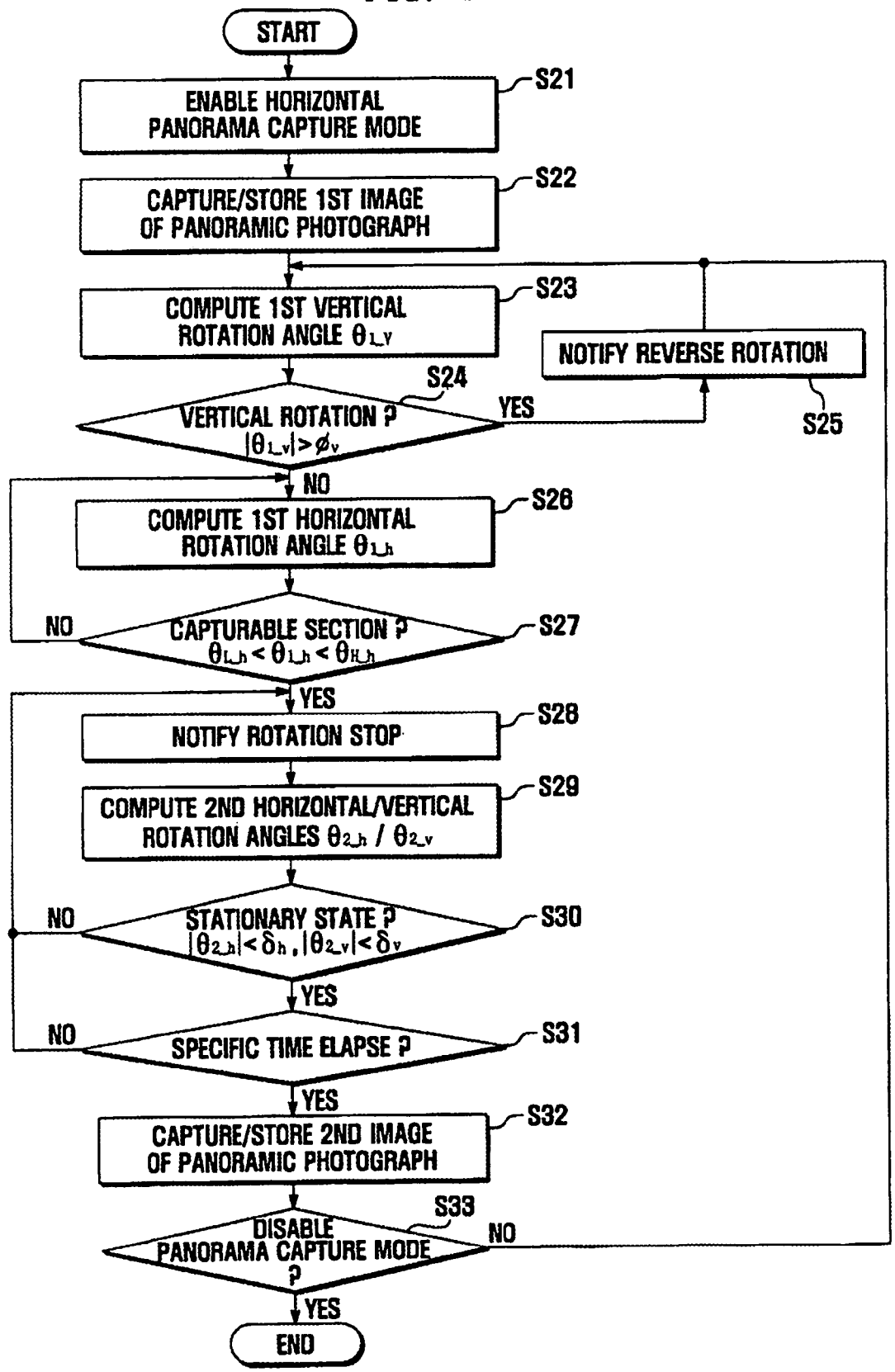
FIG. 4 is a flow diagram illustrating a method for taking a panoramic photograph in accordance with another embodiment of the invention.

FIG. 4 illustrates, in a flow diagram, a method for taking a panoramic photograph in accordance with another embodiment of the present invention. A panorama capture mode in this embodiment includes a horizontal capture mode and a vertical capture mode. For clarity, the following description will, however, be focused on the horizontal capture mode only.

Referring to FIGS. 2 and 4, when the horizontal panorama capture mode is enabled in step S21, the control unit 140 operates the camera module 110 to capture a first image of the panoramic photograph and then stores the captured image in the memory unit 120 in step S22.

Next, the angular velocity sensor 150 senses the rotation of the lens and outputs the resultant angular velocity. Then the rotation angle calculator 160 computes a first vertical rotation angle $\theta_{1\_v}$ from the outputted angular velocity in step S23. The first vertical rotation angle $\theta_{1\_v}$ is an unintended rotation angle generated by a vertical trembling when a user rotates the lens in a horizontal direction.

The first vertical rotation angle $\theta_{1\_v}$ is transmitted to the control unit 140, which decides whether there exists any rotation caused by the vertical trembling, that is, whether the absolute value $|\theta_{1\_v}|$ of the first vertical rotation angle comes within a first threshold value $\phi_v$ in step S24.

If the absolute value of the first vertical rotation angle is greater than the first threshold value ($|\theta_{1\_v}| > \phi_v$), the control unit 140 provides a reverse rotation notification to a user in step S25. This notification is preferably given by an arrow-like directional symbol on the display unit, a lamp, a sound, and the like. After providing notification of the reverse rotation, the control unit 140 repeats the previous steps S23 and S24.

If the absolute value of the first vertical rotation angle is smaller than the first threshold value ($|\theta_{1\_v}| < \phi_v$), the rotation angle calculator 160 computes a first horizontal rotation angle $\theta_{1\_h}$ from the outputted angular velocity in step S26. The first horizontal rotation angle $\theta_{1\_h}$ is an intended rotation angle generated by a horizontal rotation of the lens for capturing a second image segment.

The first horizontal rotation angle $\theta_{1\_h}$ is transmitted to the control unit 140, which decides whether the first horizontal rotation angle $\theta_{1\_h}$ comes within the capturable section in step S27. Like the previous embodiment, the capturable section is defined when the first horizontal rotation angle is in a specific range $\theta_{L\_h} < \theta_{1\_h} < \theta_{H\_h}$. The lowest and highest values $\theta_{L\_h}$ and $\theta_{H\_h}$ of the capturable section may be already assigned as a default or arbitrarily established by a user. This decision step for the capturable section may include sub-steps as shown in FIG. 3B. Furthermore, the control unit may notify a rotation direction toward the capturable section.

If the first horizontal rotation angle $\theta_{1\_h}$ is within the capturable section, the control unit 140 notifies a user to stop the rotation in step S28. Such notification of the rotation stop is preferably provided in a visual manner such as a text or an image on the display unit 130, and may also be provided in other suitable manners such as a lamp or a sound. If the first horizontal rotation angle is out of the capturable section, the previous steps S26 and S27 are repeated.

After the notification of the rotation stop, the angular velocity sensor 150 senses the rotation of the lens and outputs the resultant angular velocity. Then the rotation angle calculator 160 computes respectively a second horizontal rotation angle $\theta_{2\_h}$ and a second vertical rotation angle $\theta_{2\_v}$ from the outputted angular velocity in step S29. Such second rotation angles $\theta_{2\_h}$ and $\theta_{2\_v}$ are produced due to a hand trembling without a user's intention.

The second horizontal and vertical rotation angles $\theta_{2\_h}$ and $\theta_{2\_v}$ are sent to the control unit 140. Then the control unit 140 decides whether the lens is in a stationary state, that is, whether the respective absolute values $|\theta_{2\_h}|$ and $|\theta_{2\_v}|$ of the second rotation angles are within corresponding second threshold values $\delta_h$ and $\delta_v$ in step S30.

If the lens is not in the stationary state, the previous steps are repeated from step S28. If the lens is in the stationary state, the control unit 140 measures time and decides whether the stationary state is achieved until a specific time lapses in step S31.

If the stationary state is not achieved before the specific time lapses, the control unit 140 repeats the previous steps from step S28. If the stationary state is achieved within the specific time, the control unit 140 operates the camera module 110 to capture a second image of the panoramic photograph, while applying the hand-trembling correction algorithm. Then the control unit 140 stores the captured image in the memory unit 120 in step S32.

Next, the control unit 140 decides whether the panorama capture mode is disabled in step S33. If the panorama capture mode is still enabled, the control unit 140 repeats the previous steps from step S23 to capture subsequent images of the panoramic photograph.

Figure 5:
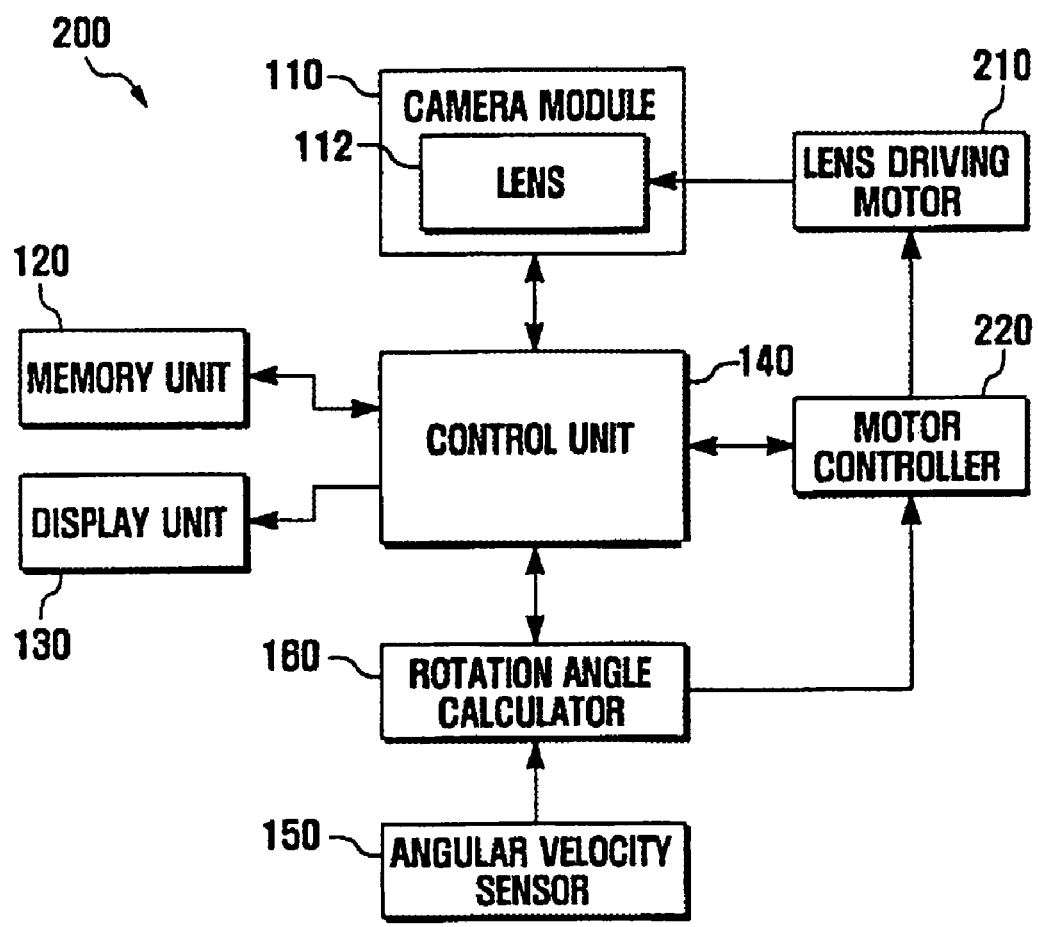
FIG. 5 is a block diagram illustrating an apparatus for taking a panoramic photograph in accordance with another embodiment of the invention.

FIG. 5 shows, in a block diagram, an apparatus for taking a panoramic photograph in accordance with another embodiment of the present invention. Referring to FIG. 5, the apparatus 200 includes a camera module 110, a memory unit 120, a display unit 130, a control unit 140, an angular velocity sensor 150, and a rotation angle calculator 160, as discussed above with reference to FIG. 2, for which related descriptions need not be repeated. The apparatus 200 in this embodiment further includes a lens driving motor 210 and a motor controller 220. A lens 112 of the camera module 110 is capable of automatic rotation under the control of the motor controller 220.

Figure 6:
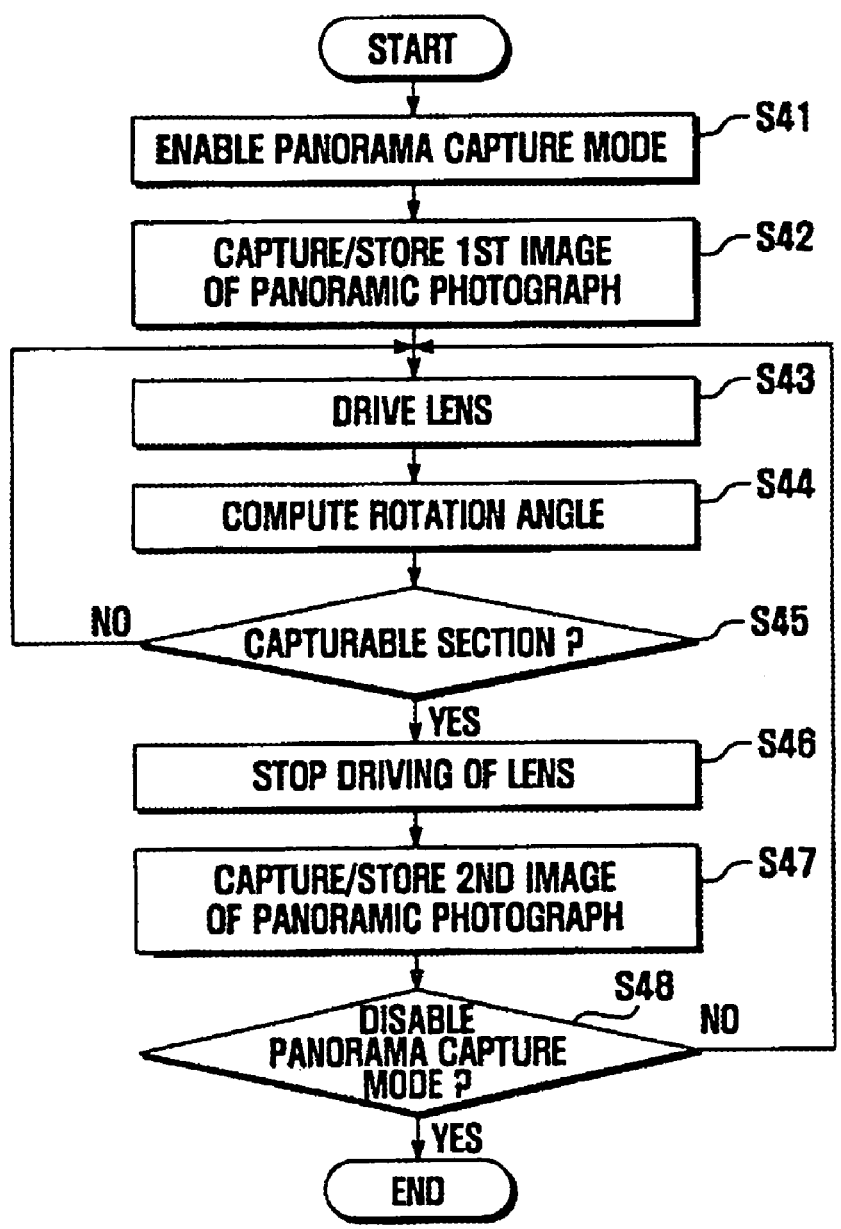
FIG. 6 is a flow diagram illustrating a method for taking a panoramic photograph in accordance with a still another embodiment of the invention.

FIG. 6 illustrates, in a flow diagram, a method for taking a panoramic photograph in accordance with yet another exemplary embodiment of the present invention. Referring to FIGS. 5 and 6, as a panorama capture mode is enabled in step S41, the control unit 140 operates the camera module 110 to capture a first image of the panoramic photograph and then stores the captured image in the memory unit 120 in step S42.

Next, the motor controller 220 operates the lens driving motor 210, which then drives the lens 112 of the camera module 110 in step S43.

Next, the angular velocity sensor 150 perceives the rotation of the lens 112 and outputs the resultant angular velocity. Then the rotation angle calculator 160 computes a rotation angle $\theta$ from the outputted angular velocity (S44).

The rotation angle $\theta$ is then transmitted to the control unit 140, which decides whether the rotation angle $\theta$ comes within a capturable section $\theta_L < \theta_1 < \theta_H$ (S45).

If the rotation angle is out of the capturable section, the motor controller 220 controls the lens driving motor 210 to drive the lens 112 in step S43, and the rotation angle calculator 160 computes the rotation angle in step S44. If the rotation angle is within the capturable section, the motor controller 220 controls the lens driving motor 210 to stop the driving of the lens 112.

If the driving of the lens is stopped, the control unit 140 operates the camera module 110 to capture a second image of the panoramic photograph, while applying the hand-trembling correction algorithm. Then the control unit 140 stores the captured second image in the memory unit 120 in step S47.

Next, the control unit 140 decides whether the panorama capture mode is disabled in step S48. If the panorama capture mode is still enabled, the control unit 140 repeats the previous steps from step S43 to capture subsequent images of the panoramic photograph.

As fully discussed heretofore, while the lens of the apparatus for taking the panoramic photograph is rotated, the angular velocity sensor such as a gyroscope outputs the angular velocity and calculates therefrom the rotation angle of the lens. Accordingly, a user can capture sequential image segments for the panoramic photograph at suitable rotation angles. Especially, since unintended rotations due to a user's hand trembling as well as user's intended rotations can be detected, it may be easy to align the overlapped portions of the adjacent images and thereby to obtain suitable images for panoramic photograph combination. Furthermore, the present invention can inform a user of a capturable section and a rotating direction by using the calculated angular velocity, so the apparatus of the invention may promote a user's convenience and do not require a burdensome tripod. Therefore, the present invention may enable the mobile terminal to simply take a desired panoramic photograph.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for taking a panoramic photograph, the apparatus comprising:
   a camera module having a lens for capturing an image for the panoramic photograph;

a memory unit for storing the image captured by the camera module;

a display unit for visually exhibiting the image stored in the memory unit and offering a preview image when a capture mode is enabled;

an angular velocity sensor for outputting an angular velocity utilizing a perceived rotation of the lens;

a rotation angle calculator for receiving the angular velocity from the angular velocity sensor and calculating a first rotation angle of the lens from a first angular velocity according to a rotation of the lens and a second rotation angle of the lens from a second angular velocity according to a further rotation of the lens; and a control unit for receiving the first rotation angle and the second rotation angle from the rotation angle calculator, notifying a stop of the rotation of the lens when the first rotation angle is within a capturable section having lowest and highest values, and capturing a second image of the panoramic photograph by operating the camera module when an absolute value of the second rotation angle is within a specific threshold value.

2. The apparatus of claim 1, wherein the display unit shows the capturable section of the panoramic photograph and a rotation direction of the lens.

3. The apparatus of claim 1, wherein the angular velocity sensor is a gyroscope.

4. The apparatus of claim 1, wherein the angular velocity sensor is geomagnetic sensor.

5. The apparatus of claim 1, wherein the angular velocity sensor outputs a horizontal angular velocity and a vertical angular velocity.

6. The apparatus of claim 1, wherein the rotation angle calculator has a low pass filter.

7. The apparatus of claim 1, wherein the control unit performs a process to compensate for a user's hand-trembling.

8. A method for taking a panoramic photograph, the method comprising steps of:
    (a) capturing a first image of the panoramic photograph by operating a camera module having a lens and then storing the captured first image;
    (b) calculating a first rotation angle of the lens from a first angular velocity according to a rotation of the lens;
    (c) deciding whether the first rotation angle is within a capturable section having lowest and highest values;
    (d) notifying a stop of the rotation of the lens when the first rotation angle is within the capturable section;
    (e) calculating a second rotation angle of the lens from a second angular velocity according to a further rotation of the lens;
    (f) deciding whether an absolute value of the second rotation angle is within a specific threshold value; and
    (g) capturing a second image of the panoramic photograph by operating the camera module when the absolute value of the second rotation angle is within the specific threshold value and then storing the captured second image.

9. The method of claim 8, wherein when the first rotation angle is not within the capturable section as a result of step (c), step (b) is performed again after step (c).

10. The method of claim 8, wherein when the absolute value of the second rotation angle is not within the specific threshold value as a result of step (f), step (d) is performed again after step (f).

11. The method of claim 8, wherein the first rotation angle is in a first direction, one of horizontal and vertical directions.

12. The method of claim 11, further comprising:
    before step (b),
    (a-1) computing the first rotation angle in a second direction perpendicular to the first direction; and
    (a-2) deciding whether an absolute value of the first rotation angle in the second direction is greater than a given value,
    wherein when the absolute value of the first rotation angle in the second direction is not greater than the given value, step (b) is performed after step (a-2).

13. The method of claim 12, further comprising:
    (a-3) when the absolute value of the first rotation angle in the second direction is greater than the given value, notifying a reverse rotation and then returning to step (a-1).

14. The method of claim 11, wherein the second rotation angle has a horizontal rotation angle and a vertical rotation angle.

15. The method of claim 8, further comprising:
    after step (f),
    (f-1) deciding whether a stationary state remains until a specific time lapses, wherein when the stationary state remains for the specific time, step (g) is performed, and wherein when the stationary state does not remain for the specific time, step (d) is performed again.

16. The method of claim 8, wherein the notifying of the rotation stop in step (d) includes visually displaying with a text or an image on a display unit, operating a lamp, or generating a sound.

17. The method of claim 8, wherein step (c) includes:
    (c-1) deciding whether the first rotation angle is smaller than the lowest value of the capturable section;
    (c-2) notifying a forward rotation when the first rotation angle is smaller than the lowest value of the capturable section;
    (c-3) deciding whether the first rotation angle is greater than the highest value of the capturable section when the first rotation angle is greater than the lowest value of the capturable section; and
    (c-4) notifying a reverse rotation when the first rotation angle is greater than the highest value of the capturable section,
    wherein step (d) is performed when the first rotation angle is smaller than the highest value of the capturable section.

* * * * *